United States Patent [19]
Winter et al.

[11] Patent Number: 6,015,207
[45] Date of Patent: Jan. 18, 2000

[54] COLOR HALFTONING OPTIONS INFLUENCED BY PRINT-MODE SETTING

[75] Inventors: Kirt Alan Winter, Escondido; Thomas G. Smith, San Diego, both of Calif.

[73] Assignee: Hewlett-Packard Company, Palo Alto, Calif.

[21] Appl. No.: 09/235,006

[22] Filed: Jan. 21, 1999

Related U.S. Application Data

[62] Division of application No. 08/759,399, Dec. 4, 1996.

[51] Int. Cl.$^7$ .............................. B41J 2/21; B41J 29/393; H04N 1/46
[52] U.S. Cl. ................................ 347/43; 347/19; 358/502
[58] Field of Search .................................... 347/43, 19, 5; 358/534, 515, 502, 504, 518; 395/109

[56] References Cited

U.S. PATENT DOCUMENTS 5,377,024  12/1994  Dillinger ................................. 358/502

*Primary Examiner*—N. Le
*Assistant Examiner*—Thinh Nguyen
*Attorney, Agent, or Firm*—Jerry R. Potts

[57] ABSTRACT

Different print quality modes in a printer such as a color inkjet printer invoke different print rendering options for a particular object to be printed. In an exemplary embodiment, a printer control automatically invokes an error diffusion haltoning technique for photo images whenever high quality mode is designated, and automatically invokes a dither haltoning technique for photo images whenever a normal or fast print mode is designated.

13 Claims, 14 Drawing Sheets

51
The user wants to create a "compound" page, with a photograph, a pie chart and text (black & color).

PHOTO — 41

52
Using a color-enabled software desktop publishing application, the user selects the text and graphics, scans in the photograph and lays out the page, specifying colors for the pie chart and color text.

CHART — 42

SEE FIG.2(B)

— 45
— 44

TEXT — 43

53A
Ready to print, the user selects Automatic Color.

53B
The user, wishing to customize the color settings to achieve the desired results, bypasses Automatic Color and selects manual color, calling up the manual setting interface.

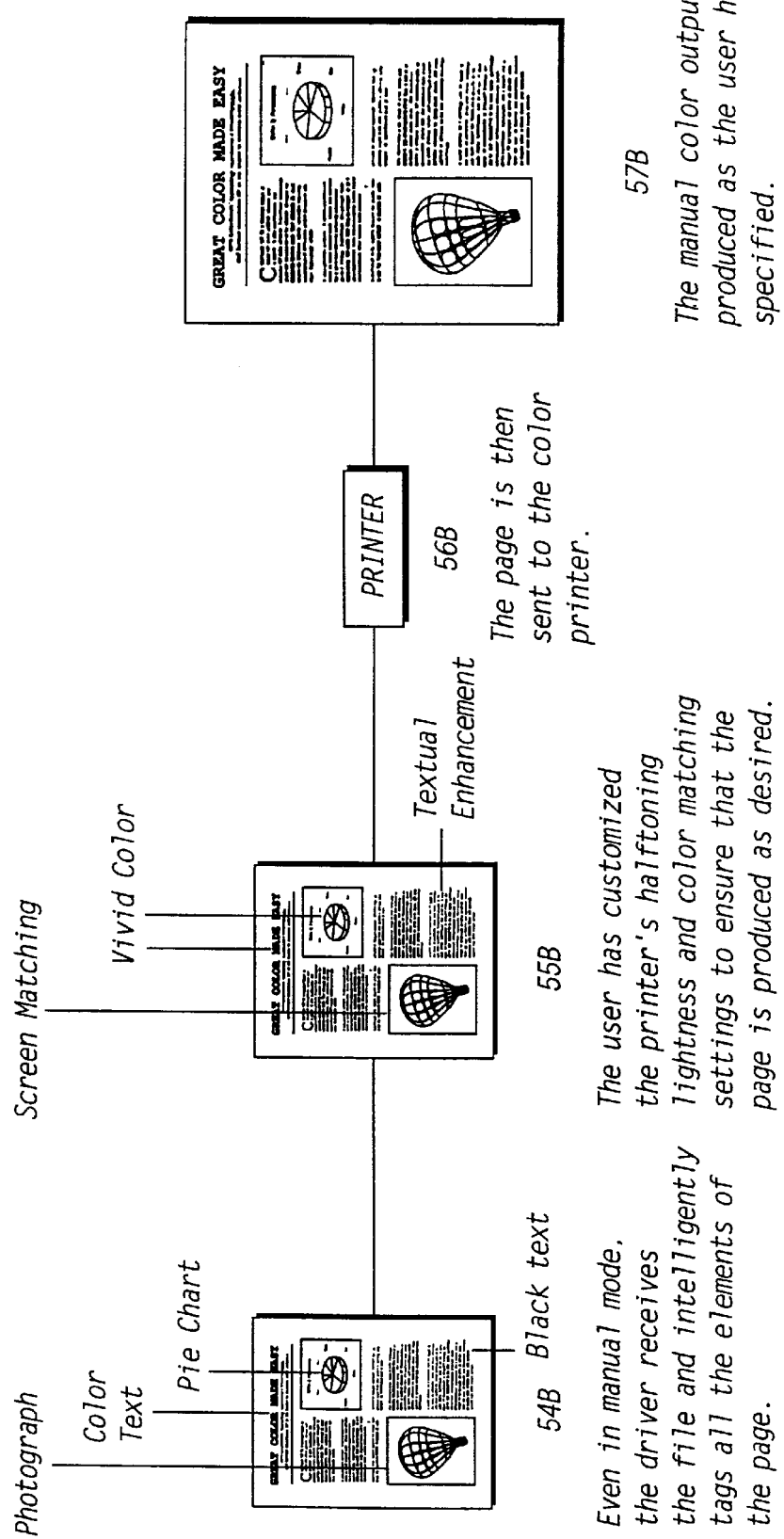

COLOR HALFTONING OPTIONS INFLUENCED BY PRINT-MODE SETTING

CROSS REFERENCE TO RELATED APPLICATION(S)

This is a divisional of copending application Ser. No. 08/759,399 filed on Dec. 4, 1996.

RELATED APPLICATIONS

Related applications which are assigned to the assignee of the present application and incorporated here by reference as follows: Atty Docket 1094206-1 entitled ADAPTIVE COLOR RENDERING BY AN INKJET PRINTER BASED ON OBJECT TYPE, filed concurrently herewith in the names of Thomas G. Smith, et al., U.S. Pat. No. 5,704,021; entitled MANUAL/AUTOMATIC USER OPTION FOR COLOR PRINTING OF DIFFERENT TYPES OF OBJECTS, filed concurrently herewith in the names of Sachin S. Naik, et al., U.S. Pat. No. 5,579,446; entitled COLOR DIGITAL HALFTONING USING COLOR VECTOR DITHERING, filed concurrently herewith in the names of Alexander Perumal, Jr., et al., U.S. Pat. No. 5,657,137; entitled COLOR DIGITAL HALFTONING USING COLOR VECTOR DITHERING AND BLACK AND SECONDARY COLOR REPLACEMENT, filed concurrently herewith in the names of Alexander Perumal, Jr., et al, U.S. Pat. No. 5,473,446; entitled BI-LEVEL DIGITAL COLOR PRINTER SYSTEM EXHIBITING IMPROVED UNDER-COLOR REMOVAL AND ERROR DIFFUSION PROCEDURES, filed concurrently herewith in the names of Gary Dispoto, et al. U.S. Pat. No. 5,402,245; entitled AUTOMATED OPTIMIZATION OF HARDCOPY OUTPUT, filed concurrently herewith in the names of Steven O. Miller, et al., U.S. Pat. No. 5,731,823; HALFTONE IMAGES USING PRINTED SYMBOLS MODELLING, filed May 3, 1993 in the name of Qian Lin, Ser. No. 08/57,244; and HALFTONE IMAGES USING SPECIAL FILTERS, filed May 11, 1993 in the name of Qian Lin, Ser. No. 08/60,285.

BACKGROUND OF THE INVENTION

This invention relates generally to color printing, and more specifically to printing different types of color objects in the same printout.

The use of color monitors for computers has accelerated the need for color printers which can produce a satisfactory printout of what is displayed on the screen. Part of the problem arises from the subjective nature of color. Color is a sensation produced by the combined effects of light, objects and human vision. A particular color or combination of colors may be appealing to one person while at the same time being offensive to another.

Another part of the problem arises from the different color technologies used in computer monitors and color printers. For example, computer monitors are based on a color gamut of red, green and blue pixels (RGB) while color printers such as inkjet printers are typically based on a color gamut of cyan, magenta, yellow and black (CMYK). The RGB color components of computer monitors are combined together in an "additive" way by mixing red, green and blue light rays to form a first variety of different colors, while the CMYK components of color inks are applied to media in different combinations in a "subtractive" way to form a second variety of different colors. A number of different color management techniques have been used on order to provide some form of matching between the colors viewed on a computer monitor and the colors printed by a specific printer using a given ink formula on a particular type of media. Such color management techniques have also employed different types of halftoning in order to improve the color output of printers.

Desktop publishing software programs have created additional problems by allowing different types of objects to be combined together into a composite document, such as photographic images, business graphics (e.g., charts), and scalable text in both color and black. By skewing the printer color output to ensure satisfactory color printing of photographic images, the business graphics in the same document often appear washed out and lose their impact. By skewing the printer color output to ensure satisfactory color printing of saturated vivid colors for business graphics, the photographic image in the same document loses its lifelike appearance.

Some of the aforementioned color printing problems have been partially solved by providing manually controlled printer settings to get the best results available. In addition, sophisticated users who demand exact color matching between screen and printout have obtained some solutions through color management software incorporated in the computer operating system as well as color management software incorporated into third party software applications. Also, some color matching technology has been incorporated into printer drivers which provide the translation interface between a particular computer and/or software application running in the computer and a color printer which acts as a hardcopy output device.

However, there is a need for better color management technology which allows for either automatic or customized settings respecting color correction as well as halftoning, and which allows different color schemes to be used for different types of objects such as photo images, business graphics, color text, and black text.

BRIEF SUMMARY OF THE INVENTION

A method for providing alternative halftone techniques used for the same types of objects to be printed, wherein different print quality modes automatically invoke different print rendering options for a particular object to be printed. As implemented in a color printer system, a printer control automatically invokes a first halftone technique such as error diffusion for photo images whenever a high quality print mode is designated, and automatically invokes a second halftone technique such as a dither whenever other print modes such as normal or fast is designated.

BRIEF DESCRIPTION OF THE DRAWINGS

FIGS. 2a, 2b and 3a, 3b are a flow chart showing how the automatic and manual options of FIG. 1 are used to produce a color printout of a composite document;

DETAILED DESCRIPTION OF THE BEST MODE OF THE INVENTION

Figure 1:
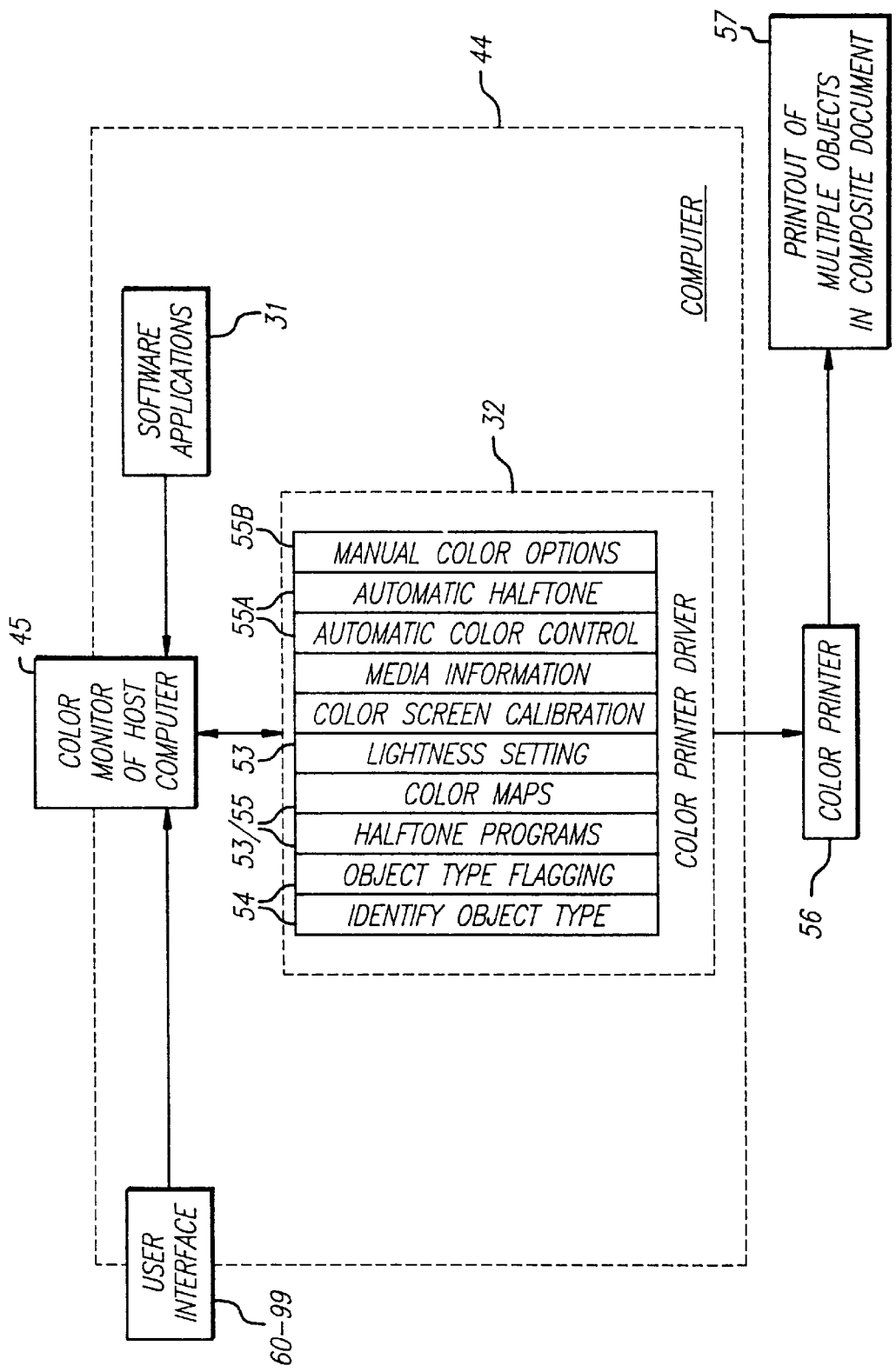
FIG. 1 is a block diagram showing a computer system employing a presently preferred embodiment of the invention.
Figure 2:
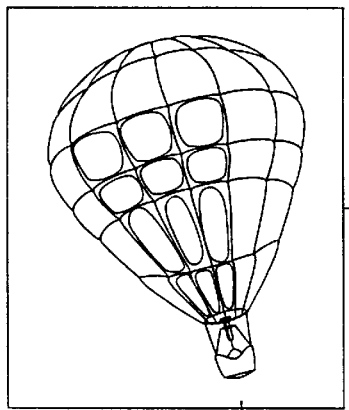
Figure 2:
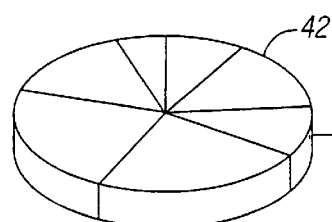
Figure 2:
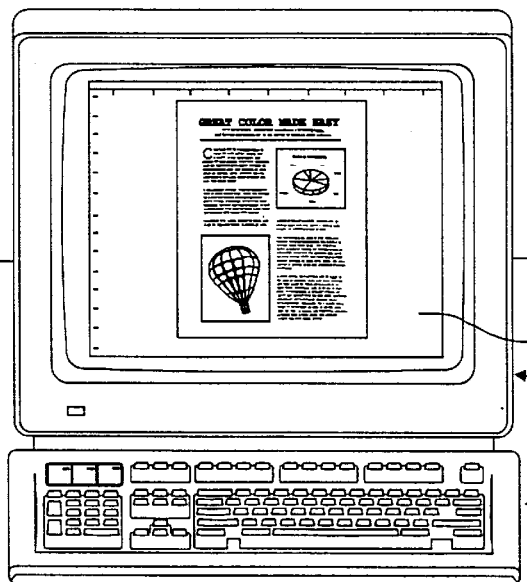
Figure 2:
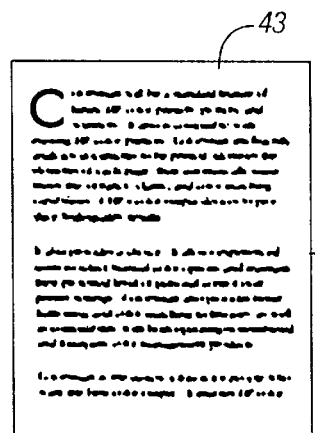
Figure 2:
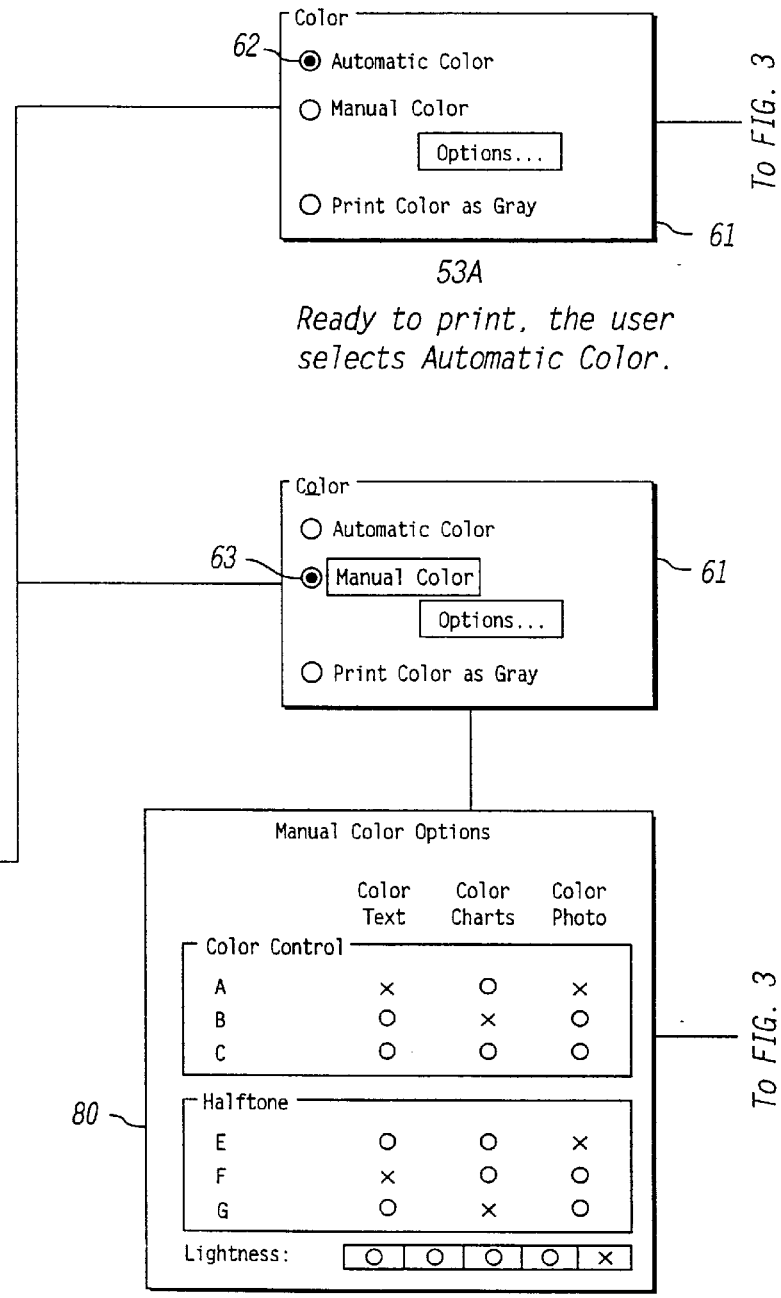
Figure 3A:
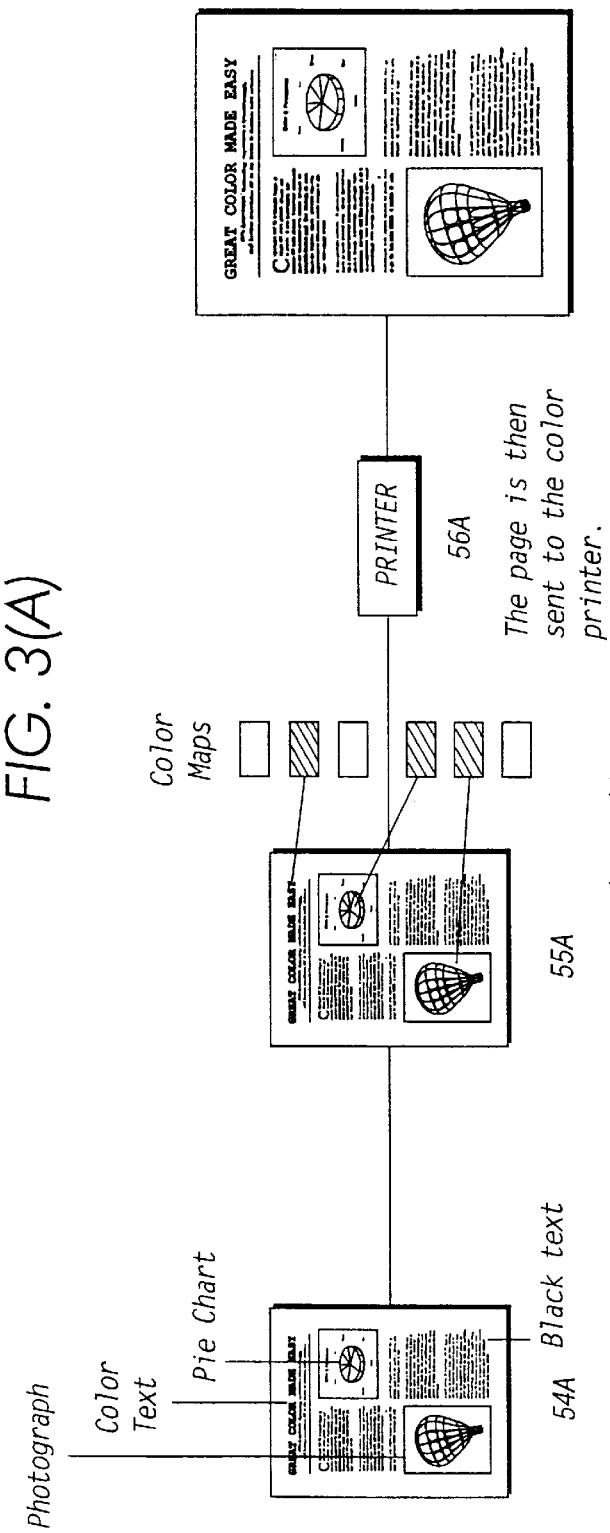

Generally speaking, the invention provides improved print quality for composite documents which have different types of objects to be printed in the same document and in many instances on the same page. In an exemplary printer system as illustrated in the drawings, one or more different types of color objects are identified and flagged, a preferred rendering option such as halftoning and/or color matching is selected for each one of such different color object types, and then the document is printed in accordance with the rendering options selected for each of such different color object types. The color inkjet system of the preferred embodiment includes a printer coupled through a printer driver to a host computer. A default halftoning technique and a default color matching map are incorporated in the printer system for automatic invocation whenever a particular color object type is printed.

The invention has features which provide either automatic or manual implementation of various rendering options. For example, in the color inkjet system shown, an interactive user interface allows a choice between one button automatic control of color output or multi-button control of color output, with both automatic and manual options providing independent control for color halftone and for color correction based on the types of objects to be printed. The preferred form allows separate print rendering options for text, graphics and photo images.

Figure 11:
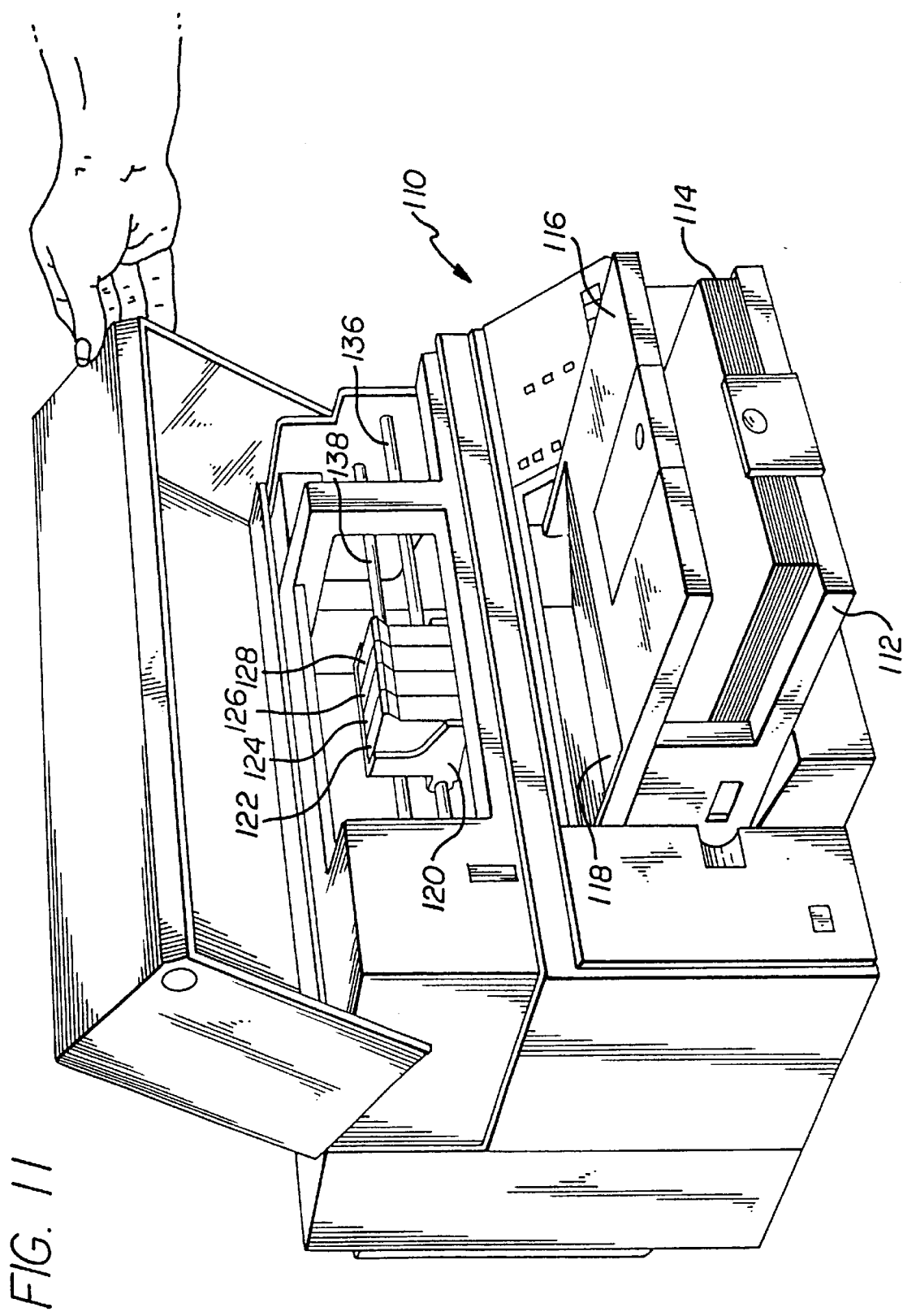
FIGS. 11 and 12 show a typical color inkjet printer for incorporating the color printout features of the present invention.
Figure 12:
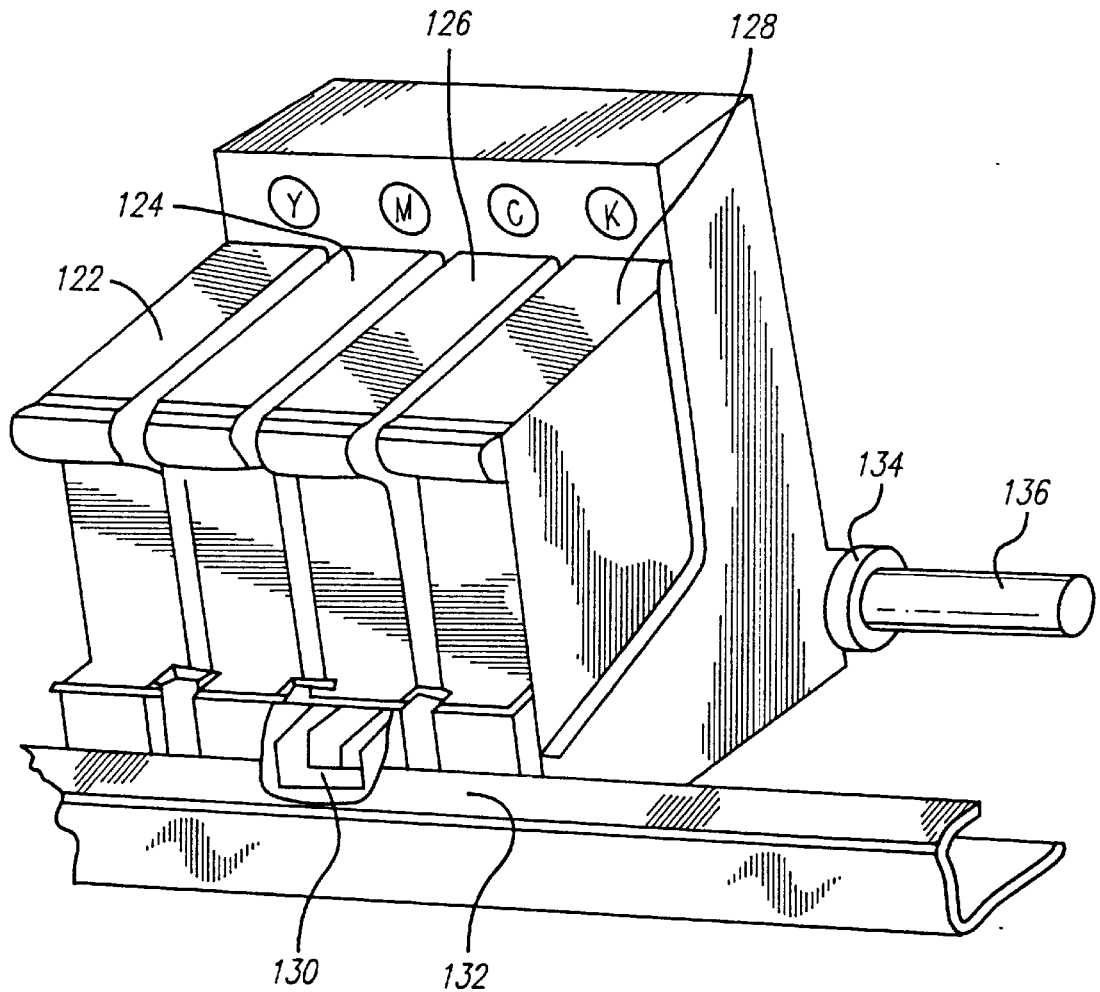

Different print quality modes in the printer invoke different print rendering options for a particular object to be printed. In the exemplary embodiment, a printer control printer 110 includes an input tray 112 containing sheets of media 114 which pass through a print zone, and are fed past an exit 118 into an output tray 116. Referring to FIGS. 11–12, a movable carriage 120 holds print cartridges 122, 124, 126, and 128 which respectively hold yellow (Y), magenta (M), cyan (C) and black (K) inks. The front of the carriage has a support bumper 130 which rides along a guide 132 while the back of the carriage has multiple bushings such as 134 which ride along slide rod 136. The position of the carriage as it traverses back and forth across the media is determined from an encoder strip 138 in order to be sure that the various ink nozzle on each print cartridge are selectively fired at the appropriate time during a carriage scan.

Figure 4:
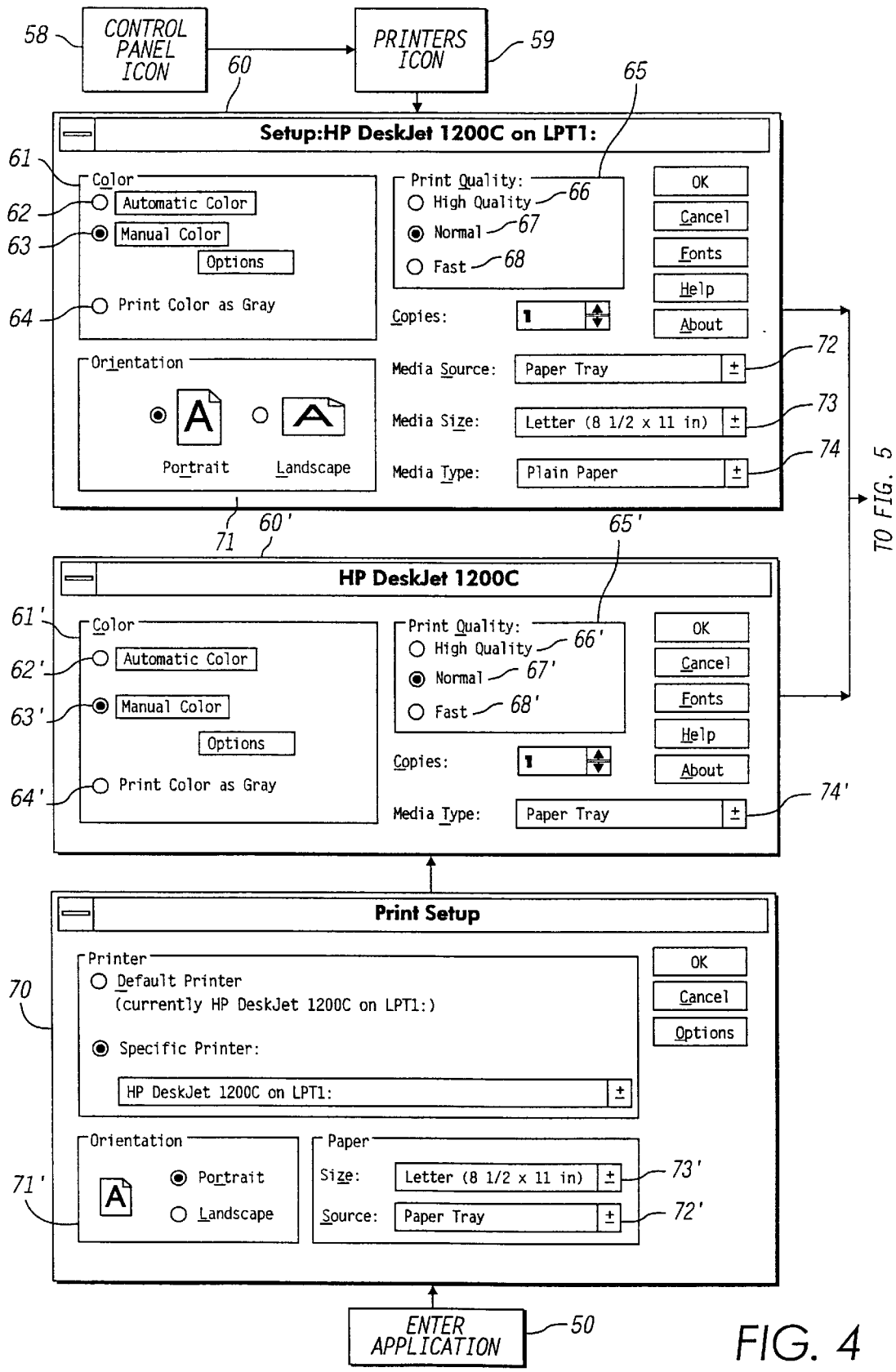
FIGS. 4 and 5 show a sequence of interactive computer screens available to a user who proceeds through the flow chart of FIGS. 2 and 3.

In Windows 3.1, Microsoft developed the notion of a common print dialog as shown in FIG. 4. This is called from the application of Windows directly. When this dialog is used, some Setup Dialog features have been addressed (namely Orientation, Paper Size, and Paper Source) and therefore do not need to be presented to the user again in the driver's Setup Dialog. With this in mind, the driver will only display the modified version of the Setup Dialog when the driver is called from the common print dialog.

Figure 5:
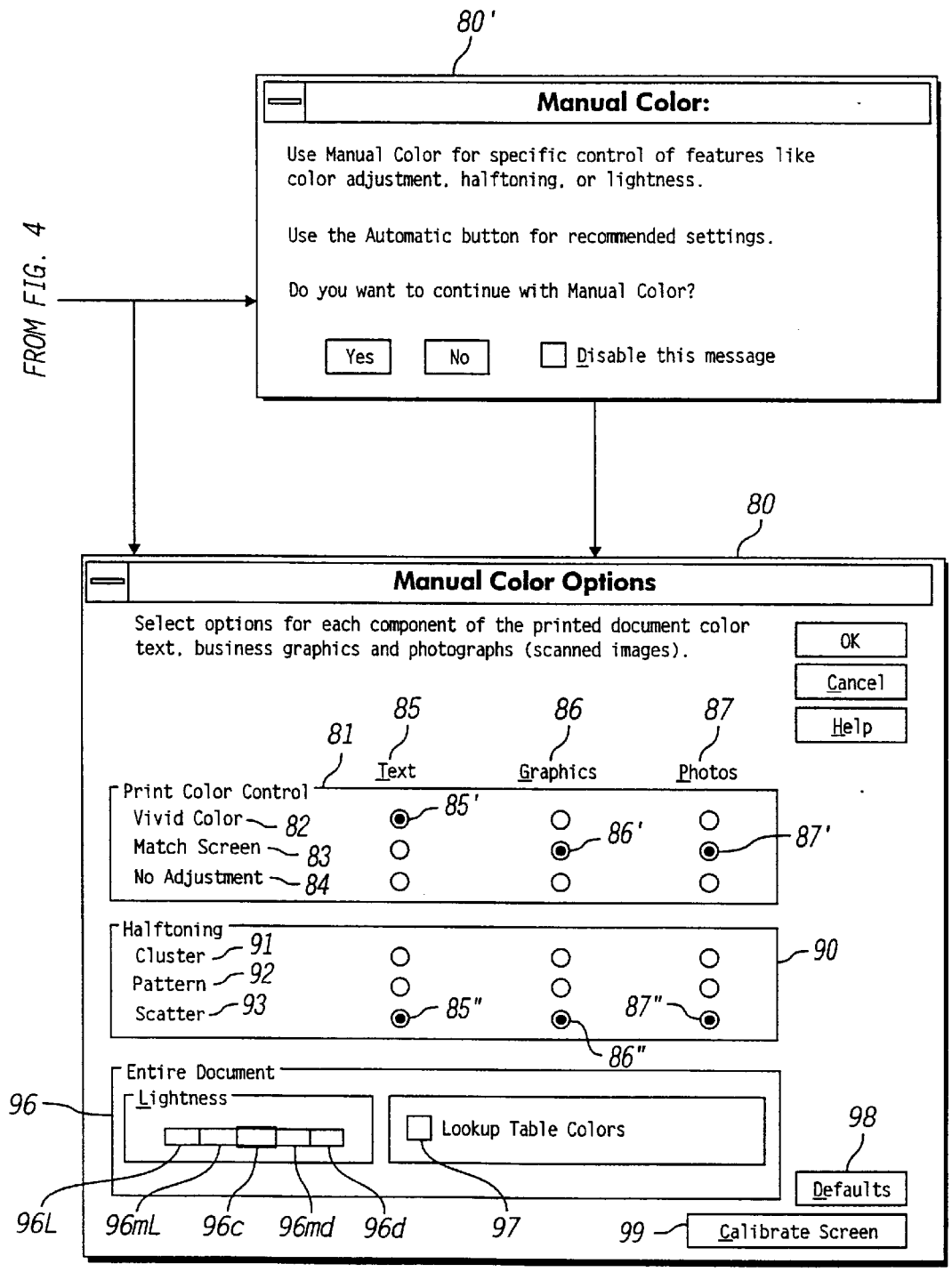
Figure 6:
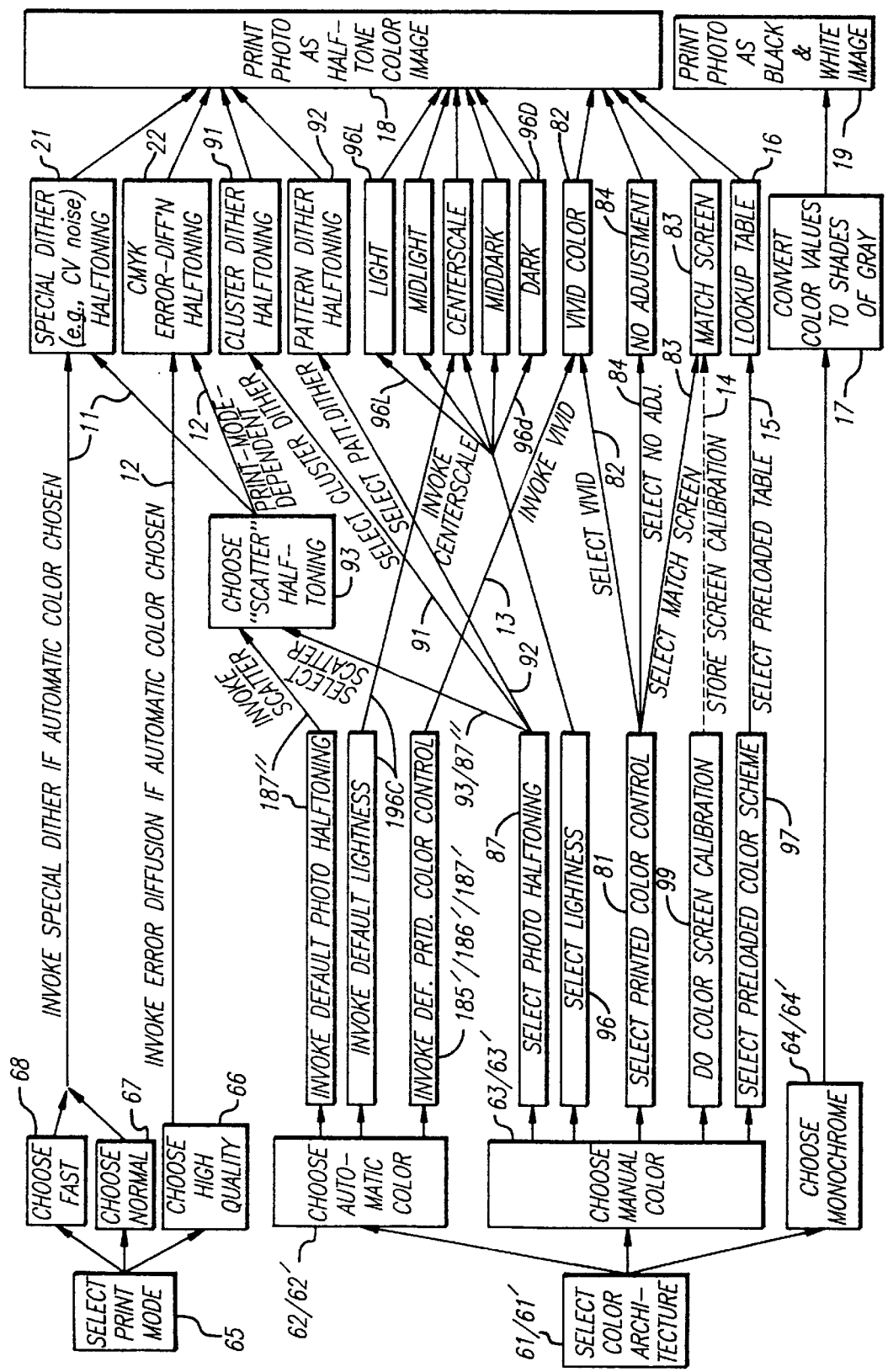
FIG. 6 is a schematic block diagram for producing color photo printouts in accordance with the preferred embodiment of FIG. 1.
Figure 7:
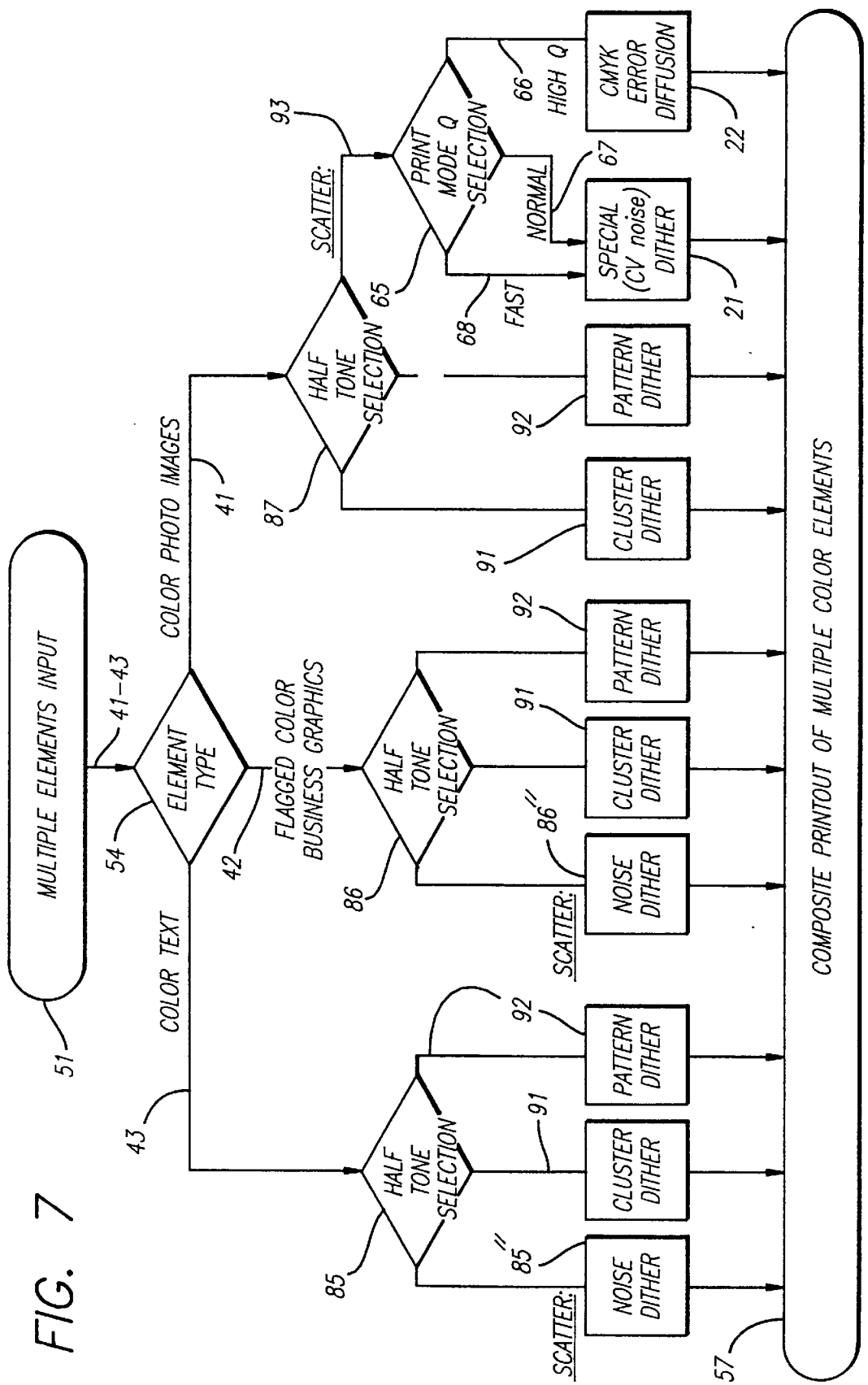
FIG. 7 is a halftone flow chart for the preferred embodiment of FIG. 1.
Figure 8:
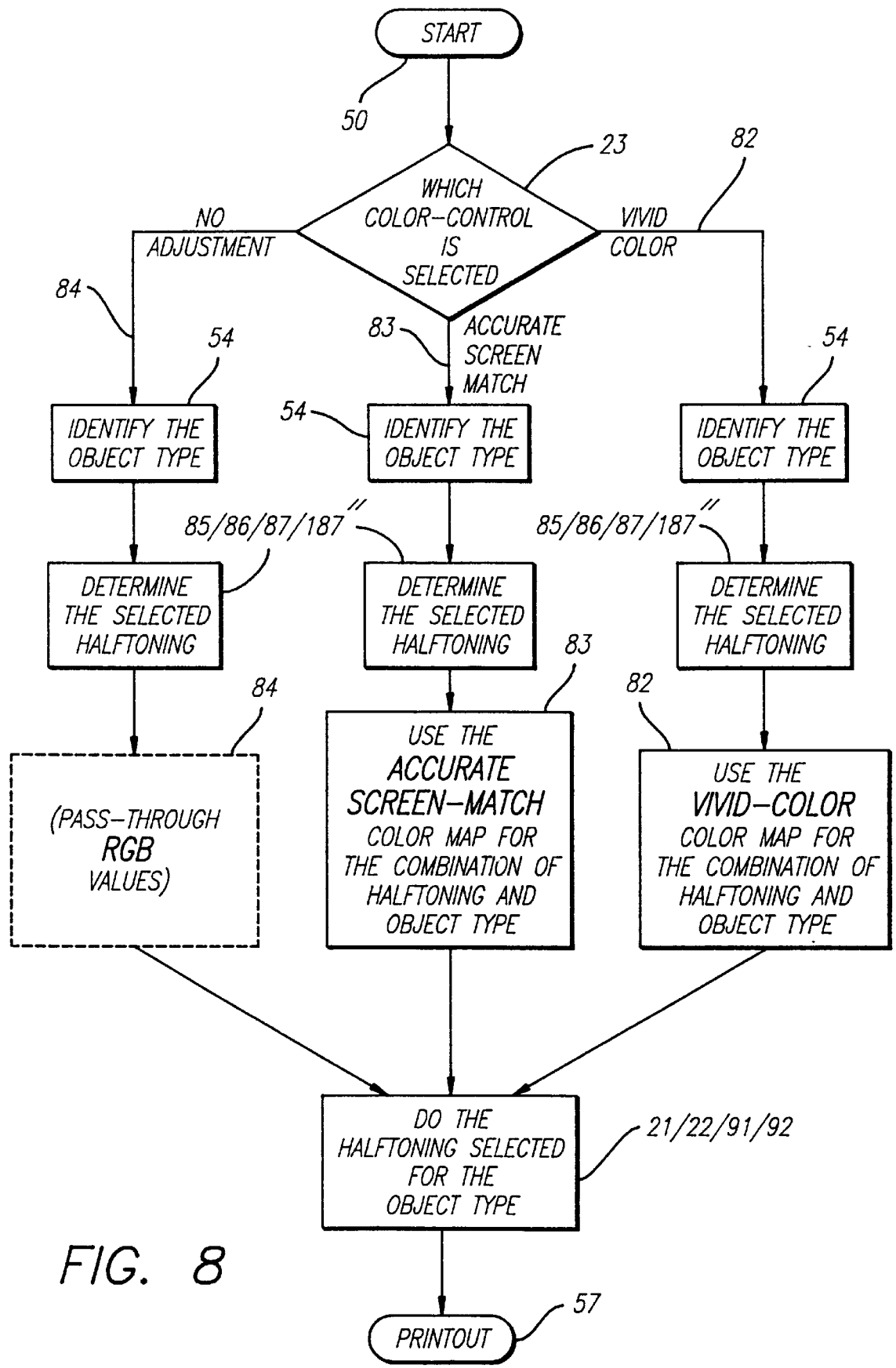
FIG. 8 is a color control flow chart for the preferred embodiment of FIG. 1.

As shown in FIG. 5, the user options presented in the Manual Color Options are divided into two categories. The first category contains the Printed Color Control and the Half toning method. These options can be selected on an object-by-object basis (the objects in this case are text, graphics and photo objects). In other words, the Printed Color Control can be put into a different mode for text as for graphics and also for photographic-type images. The Half toning method can also be different for the three different types of objects.

The second category contains the Lightness slider and the Pantone Color mode. These options can be set only on a job-by-job basis. This means that the Lightness and Pantone mode act upon the entire job regardless of what type of objects are in each job (or on each page of the job).

The driver will adjust the incoming RGB data by applying a gamma correction to produce the adjusted RGB data in the following manner:

LIGHTNESS SLIDER TABLE

| | Lightest | Lighter | Normal | Darker | Darkest |
|---|---|---|---|---|---|
| Accurate Match | Gamma: 0.5 | Gamma: 0.7 | Gamma: 1.0 | Gamma: 1.2 | Gamma: 1.4 |
| Clear and Vibrant | Gamma: 0.5 | Gamma: 0.7 | Gamma: 1.0 | Gamma: 1.2 | Gamma: 1.4 |
| No Adjustment | Gamma: 0.3 | Gamma: 0.4 | Gamma: 0.6 | Gamma: 0.8 | Gamma: 1.0 | automatically invokes an error diffusion halftoning technique for photo images whenever high quality modes is designated, and automatically invokes a dither halftoning technique for photo images whenever a normal or fast print mode is designated.

It is important to note the the location of the color management functionality is somewhat flexible within the printer system. Such functionality in the presently preferred version of the invention is primarily in the printer driver, but it could be implemented in the printer driver and/or printer firmware and/or even in the printer hardware (e.g., custom ICs, etc.)

The embodiment of the invention is used in an inkjet printer of the type shown in FIG. 11, In particular, inkjet Pantone characterized both the DJ 1200C and PJ XL300 to create a Pantone lookup table to be incorporated into the driver. When this mode is selected, the driver will check all incoming RGB values against the key values provided by Pantone. If there is an exact match, then the driver will map the incoming RGB value into the correct (according to Pantone) RGB value to send to the printer to produce the closest approximation of the Pantone color selected.

Only Plain Paper (on the DJ 1200C) has been Pantone certified (and Special Paper on the PJ XL300). If the user attempts to check the Pantone checkbox when the appropriate media type is not selected, a warning message appears.

Defaults button: This button will reset all the user options in this dialog back to the factory default position for the mode. These defaults are shown on the Manual Color Options Dialog.

Calibrate Screen button: Brings up the Calibration utility. The user will use this when he/she wants to recalibrate the monitor in order to build new maps for the Accurate Screen Match mode.

The matrices below show the type of color matching and half toning that is implemented in the driver for the various user-selectable options in this dialog. The following are definitions of the matrix entries.

HMS type color map: Used to boost the vibrancy of the hue associated with the given RGB value.

Accurate color map: Created when a user calibrates his/her monitor with screen calibration in order to get printed output that matches what's on the user's screen.

No Adjustment: The driver does not do any processing of incoming RGB data. This is the mode that users may utilize in order to control exactly the RGB values that are sent to the printer.

HPL Noise with CV: This Half toning option utilizes a 128×128 byte Noise dither matrix along with conversion of the RGB data into Color Vector (CV) data. This provides closer to Error Diffusion quality with about the speed of normal dithering. (Used when in Fast/Normal printing mode and scatter half toning is selected.)

HPL Noise is disclosed in Ser. Nos. 57,244 and 60,285

HPL Noise with CV is disclosed in Atty Dockets 1094173-1 and 1094230-1 filed concurrently herewith.

CMYK error diffusion is disclosed in Atty docket 1094210-1 filed concurrently herewith.

CMYK Err Diff: This Half toning option utilizes a CMYK Error Diffusion algorithm. This provides the highest quality output (for photographic images only) although it is the slowest half toning method. (Used when in High Quality printing mode and scatter half toning is selected.)

Current Cluster dither: This is the same Cluster dither that is currently in the DJ 1200C and PJ XL300. This method is faster than Error Diffusion and provides good edge definition for text and graphics.

Current Bayer dither: This is the same Pattern dither that is in the DJ 1200C and PJ XL300 currently. This method is the same speed as Cluster dither and has been preferred by some users The following tables outline the type of color map and half toning used for the various U/I settings.

TABLE

Printed Color Control/Half toning matrix for TEXT & GRAPHICS

|  | Clear and Vivid | Accurate Match | No Adjustment |
|---|---|---|---|
| Scatter | HMS color map (#1) | Accurate map (#8) | RGB pass-through |
|  | HPL Noise | HPL Noise | HPL Noise |
| Cluster | HMS color map (#2) | Accurate map (#9) | RGB pass-dirough |
|  | Current Cluster dither | Current Cluster dither | Current Cluster dither |
| Pattern | HMS color map (#3) | Accurate map (#10) | RGB pass-through |
|  | Current Bayer dither | Current Bayer dither | Current Bayer dither |

Printed Color Control/Half tonig matrix for PHOTOGRAPHIC Images

|  | Clear and Vivid | Accurate Match | No Adjustment |
|---|---|---|---|
| Scatter | HMS color map #(4,5) | Accurate map (#8, 11) | RGB pass-through |
|  | HPL Noise with CV or CMYK Err. Diff | HPL Noise with CV or CMYK Err. Diff. | HPL Noise with CV or CMYK Err. Diff |
| Cluster | HMS color map #(6) | Accurate map (#9) | RGB pass-through |
|  | Current Cluster dither | Current Cluster dither | Current Cluster dither |
| Pattern | HMS color map #(7) | Accurate map (#10) | RGB pass-through |
|  | Current Bayer dither | Current Bayer dither | Current Bayer dither |

There are two possible implementations of Scatter for Photos. One is the HPL Noise dither with CV. This will be the default since it is fast and gives better output quality for raster images (when compared to cluster or pattern). The other implementation is CMYK Error Diffusion which provides even better quality, but with a significant degradation in performance. The selection will be based on the user interface Print Quality mode. High Quality will map to CMYK Error Diffusion and Fast/Normal will map to CV Noise.

The total number of maps needed is shown also in the matrices above. There will be 11 maps needed for all the combinations of color matching modes and half tone methods.

This is a significant increase in the number of maps shipped and will definitely put the space required for installation above the amount that can fit onto one disk. Therefore, the decision has been made to ship the driver on 2 disks. order to accommodate this.

Figure 9:
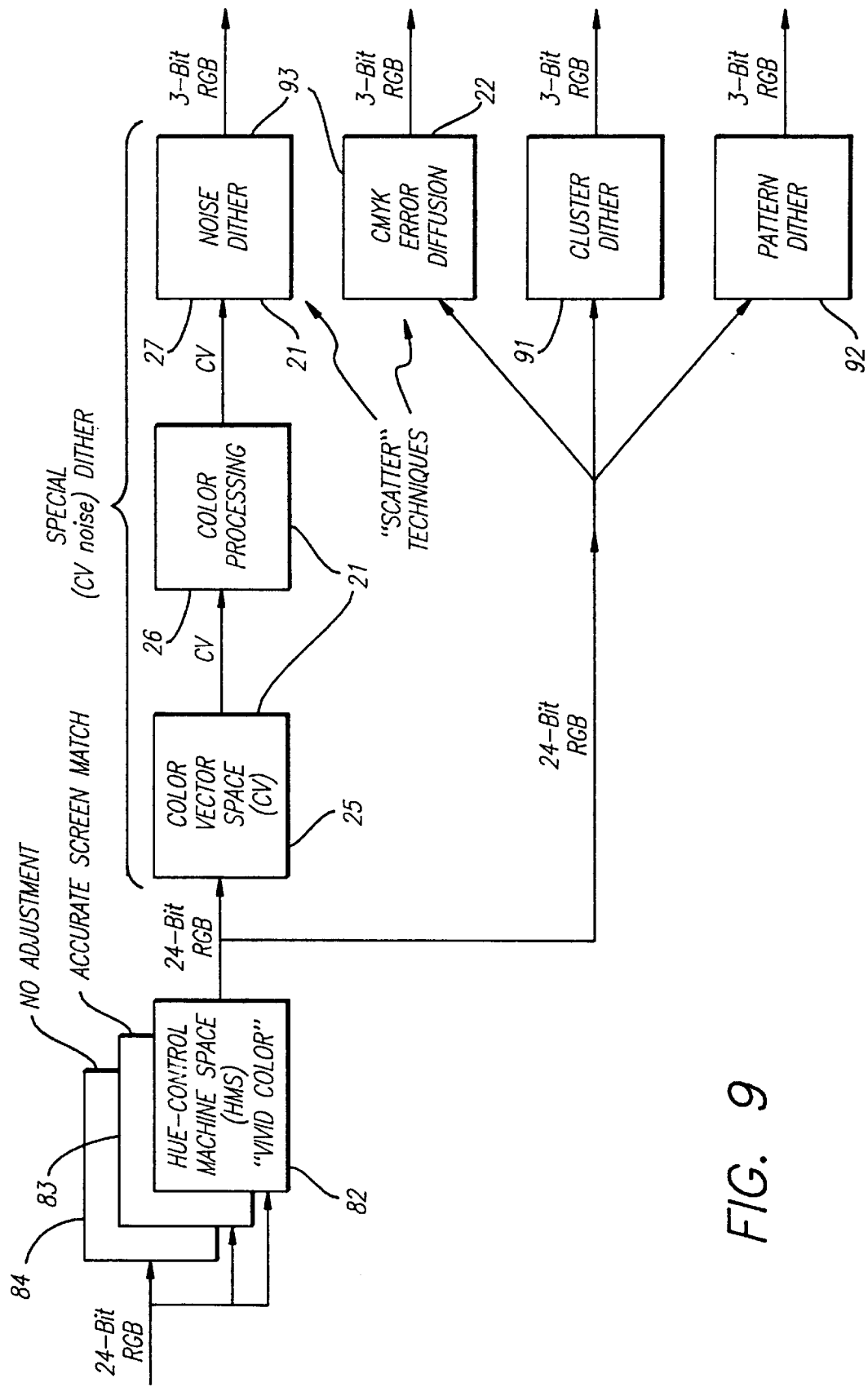
FIG. 9 is a functional block diagram showing the relationship of color control and halftoning in processing and printing photographic images.
Figure 10:
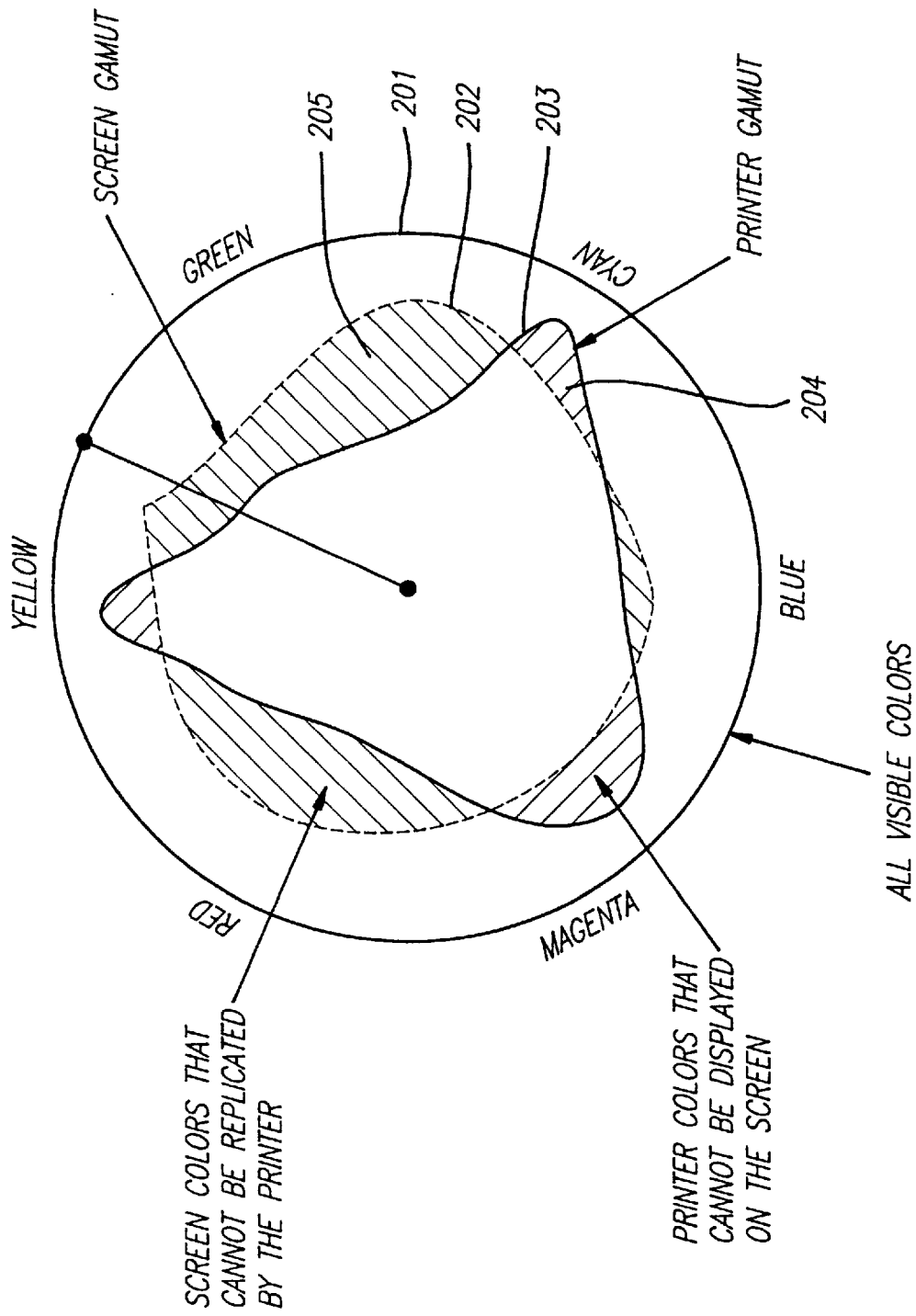
FIG. 10 is a schematic diagram showing the different color gamuts of visible light, a computer screen, and a printer which are used in the color control flow chart of FIG. 8.

As the FIG. 9 shows, the input to the whole system is 24 bit RGB, and the output is 3 bit RGB sent to the printer. The steps involved are: choosing one of the color maps (HMS1, Accurate, or none) and mapping the color to another 24 bit RGB value, converting this value to CV Space (in the case of Noise Dither), doing some color processing in CV Space and then Half toning in CV Space. For Cluster, Pattern, and Error Diffusion, the half toning is done in RGB space.

The color matching portion of the color path is always done in the driver. The CV processing and half toning is done either in the driver or in the printer, depending on the type of object being rendered.

The following diagram shows where the different objects are rendered. All objects that are not already rendered in the application (which is most objects) are either rendered in the Windows driver or in the PCL5 F/W on the printer.

| Type of Object | Where it is rendered |
|---|---|
| AU Text Objects | Printer |
| All Graphics Objects (Squares, Circles, . . . Business Graphics) | Printer |
| 1, 4, 8-bit photo-type images (Cluster & Pattern half tone) | Printer |
| 1, 4, 8-bit photo-type images (Scatter half tone - Noise & Err. Diff.) | Windows Driver |
| An 24-bit photo-type images | Windows Driver |

For objects that are rendered in the printer, the object is sent down from the Windows driver to the printer with 24-bit RGB values associated to it. Color processing is done in the driver (Color Matching, Lightness Slider, and Pantone Match) before the final RGB value is Sent to the printer. Based on the user's half toning selections in the UI, a PCL command is also sent to the printer to set the appropriate rendering mode in the printer. The printer is then responsible for rendering all the objects and, in some cases, for scaling raster images.

The only objects that are rendered in the Windows driver are photo-type images that use the Scatter half tone, (because not all the printers support the scatter mode and 24-bit photo-type images. The reason the Scatter half tone is rendered in the driver is because not all the printers support the Scatter mode and the only way to support both error diffusion and Noise dither on all the printers is to provide it in the driver. The 24-bit images are rendered in the driver regardless of the half toning mode in order to minimize the amount of data sent over the I/O. Each 24-bit RGB pixel can be half toned down to 3-bits per pixel which provides an automatic 8-to-1 compression in addition to the PCL compression on those 3-bits.

It will thus be appreciated from the foregoing description that many improvements are provided by the present invention. In the past users have only have limited control in the selection of rendering options and color correction options. That is, they have been limited to choosing one particular rendering option and/or one particular color correction option for an entire documents. With the present invention, it is now possible for users to select an independent rendering option and independent color correction option for each type of object (e.g., text, business graphics and photographic images). For example, in the printer driver dialog screens shown in the drawings, a user can select a Scatter halftone for photographic images, a Pattern halftone for business graphics, and a Cluster halftone for text.

In addition, color correction options can be chosen for each object type independently of the halftone. This independent control for halftone and color correction for each object gives the user a multitude of options and very fine control of the quality and appearance of the printed output. With the ability to render and color correct objects based on their particular type, it is possible to pre-determine which halftone and which color correction option would be best for each object type. Thus, the invention provides an automatic default that produces the best quality output for most users of a particular printer, as well as a manual default that can be changed by the user.

Furthermore, another printout quality feature can be automatically implemented as a default in the printer system. For example, in the preferred embodiment it was determined that users prefer a particular error diffusion halftoning over other kinds of dither halftoning. This has been implemented in the print quality printmode options of the type used by many manufacturers. Such printmode options allow users to choose settings such that the printer technology itself could be optimized for either fast output or higher quality output. It was discovered that this option could also be used to make the same kind of tradeoff within the printer driver itself, and in particular solved the problem of which halftoning method to used for certain complex objects like photographic images. Thus, if the user chooses a print quality setting of "high quality", the driver will perform CMYK error diffusion to render all raster images (e.g., photographic images), while settings of "Normal" or "Fast" for the printmodes will cause the driver to perform noise dithering on all raster images.

While various examples and embodiments of the invention have been shown and described, it will be appreciated by those skilled in the art that the spirit and scope of the invention is not limited to the specific description and drawings herein, but extends to various modifications and changes all as set forth in the following claims.

We claim as our invention:

1. A method of controlling print quality comprising:

defining a screen color gamut indicative of all the visible colors in a monitor image, said screen color gamut falling within a predefined color gamut inclusive of all visible colors;

defining a printer color gamut within said predefined color gamut, said printer color gamut and said screen color gamut having mutually exclusive portions and mutually inclusive portions within said predefined color gamut; and selecting the mutually exclusive portions of said printer color gamut for printing the monitor image in vivid colors, said vivid colors not being visible to a user viewing the monitor image but being visible in a printed image formed on a print medium.

2. A method of controlling print quality according to claim 1, further comprising:

invoking a print rendering option for one type of image object in a print mode; and alternatively invoking another print rendering option for the one type of image object in another print mode.

3. A method of controlling print quality according to claim 2, further comprising:

providing a plurality of different print modes to facilitate the steps of invoking.

4. A method according to claim 1, further comprising:

printing the monitor image on said print medium using at least the selected exclusive portions of said printer color gamut.

5. A method according to claim 4, further comprising:

selecting the mutually inclusive portions of said screen color gamut and said printer color gamut for printing the monitor image on said print medium.

6. A method according to claim 4 wherein the step of printing including depositing indicia forming material onto said print medium.

7. A method according to claim 6, wherein said step of depositing indicia forming material includes depositing ink droplets onto said print medium.

8. A method of controlling print quality comprising:

defining a screen color gamut indicative of all the visible colors in a monitor image, said screen color gamut falling within a predefined color gamut inclusive of all visible colors;

defining a printer color gamut within said predefined color gamut, said printer color gamut and said screen color gamut having mutually exclusive portions and mutually inclusive portions within said predefined color gamut;

selecting the mutually exclusive portions of said printer color gamut for printing the monitor image in vivid colors, said vivid colors not being visible to a user viewing the monitor image but being visible in a printed image formed on a print medium; and printing the monitor image on said print medium using at least the selected exclusive portions of said printer color gamut.

9. A method of controlling the quality of printing comprising:

invoking a print rendering option for one type of image object in a print mode;

alternatively invoking another print rendering option for the one type of image object in another print mode;

providing a plurality of different print modes to facilitate the steps of invoking;

defining a screen color gamut indicative of all the visible colors in a monitor image, said screen color gamut falling within a predefined color gamut inclusive of all visible colors;

defining a printer color gamut within said predefined color gamut, said printer color gamut and said screen color gamut having mutually exclusive portions and mutually inclusive portions within said predefined color gamut; and selecting the mutually exclusive portions of said printer color gamut for printing the monitor image in vivid colors, said vivid colors not being visible to a user viewing the monitor image but being visible in a printed image formed on a print medium.

10. A method according to claim 9, further comprising:

printing the monitor image on said print medium using at least the selected exclusive portions of said printer color gamut.

11. A method according to claim 10, further comprising:

selecting the mutually inclusive portions of said screen color gamut and said printer color gamut for printing the monitor image on said print medium.

12. A method according to claim 10 wherein the step of printing including depositing indicia forming material onto said print medium.

13. A method according to claim 12, wherein said step of depositing indicia forming material includes depositing ink droplets onto said print medium.

* * * * *